Nov. 2, 1971  G. K. DE HART  3,616,479
PLUMBER'S NOZZLE
Filed July 24, 1970

INVENTOR.
GEORGE K. De HART
BY
Knox & Knox

United States Patent Office 3,616,479
Patented Nov. 2, 1971

3,616,479
PLUMBER'S NOZZLE
George K. De Hart, Imperial Beach, Calif., assignor to Floyd E. Minor, Pacific Beach, and Douglas A. McGrew, Chula Vista, Calif., fractional part interest to each
Filed July 24, 1970, Ser. No. 57,987
Int. Cl. B08b 9/02
U.S. Cl. 15—104.3      3 Claims

ABSTRACT OF THE DISCLOSURE

A clean-out tool for unblocking plumbing and designed for use by plumbers and householders. Being attached to the end of a flexible hose it forms an extension thereof and the flushing action is localized as two jets of water at opposite sides of a uniquely shaped chisel attached in the end of the hose and cooperating with the hose to define a fluid outlet in two parts and of reduced size to assure such jet action.

BACKGROUND OF THE INVENTION

The most common form of device for cleaning blocked pipes is the flexible snake which is capable of negotiating turns in a pipe and which can be rotated in whole or in part by manual or power means. Ordinarily water is not simultaneously led into the blocked pipe when such a snake is used but other procedures include pressurizing means, using simple devices such as the rubber "plumbers friend" and more sophisticated items relying on explosive force of suddenly released pressurized containers which hopefully literally blast the obstruction out of the pipe. The prior art also includes many chemical items proposed as capable of reacting with the stoppage material in pipes and these are doubtless effective in instances where stoppage is not complete. There exists a need however, for an inexpensive, safe and easily operated devce, particularly for the householder, but also available to the professional plumber, which can be easily stored and quickly and easily activated when minor blockages or near blockages occur.

SUMMARY OF THE INVENTION

The above mentioned need is met by the instant invention which, as claimed, is a simple short length of flexible hose with a hose connection at one end and a specially shaped chisel fixed in the other end in such manner that the action of the chisel is accompanied by the action of two jets of pressurized water at the opposite edges of the chisel.

DETAILED DESCRIPTION OF A PREFERRED EMBODIMENT

Figure 1:
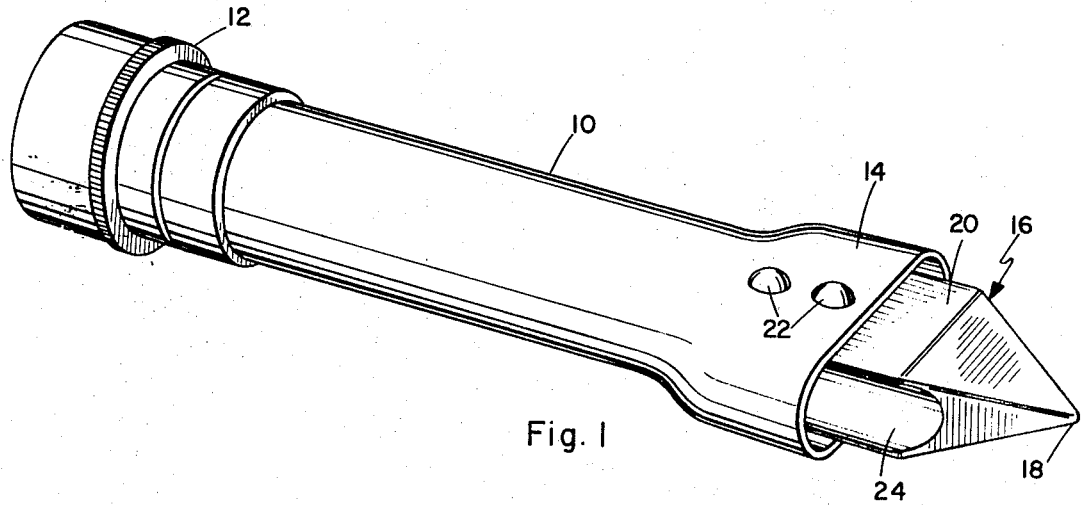
FIG. 1 is an isometric view of the invention.
Figure 2:
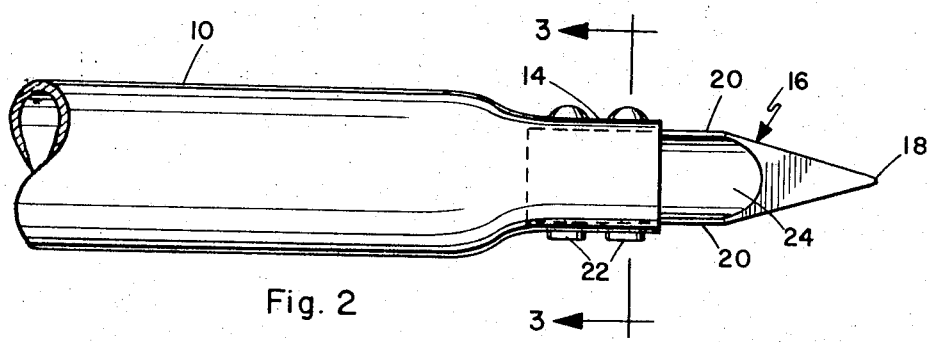
FIG. 2 is an elevational view with the hose connection deleted.
Figure 3:
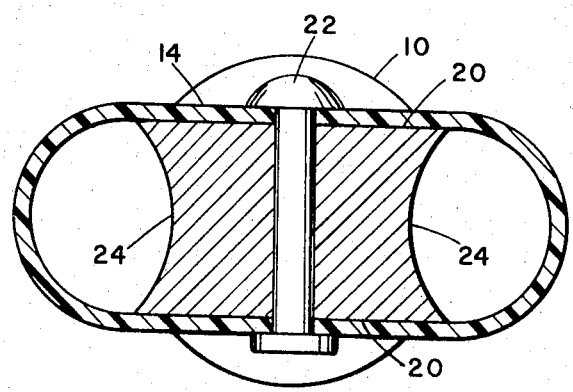
FIG. 3 is transverse sectional view taken on the line 3—3 in FIG. 2.

The environment wherewith this invention will be used includes a hose, not shown, connected to a source of pressurized water and, of course, blocked or nearly blocked pipe such as a sewage pipe. The present invention includes a short section of flexible conduit 10 which may be a good quality garden hose and a hose connector 12 is mounted on one end of the conduit for connection to a longer length of hose, not shown in the drawing.

The other end 14 of the conduit 10 has mounted therein a chisel generally indicated by the numeral 16. This chisel has a sharp point 18 and a shank with two flat sides 20 upon which the end portion 14 of the conduit is collapsed. Rivets 22, or the equivalent, are used to hold the conduit collapsed onto the flat sides 20, as indicated in each of the figures of the drawing.

The other sides 24 of the shank are transversely concave. The shank is dimensioned relative to the conduit diameter in such proportion that the fluid outlet is reduced just sufficiently to provide an efficient jet action flow. One such proportion, as given here as merely exemplary, is arrived at by making the flat sides of a transverse dimension slightly less than the internal diameter of the conduit and the remaining sides with a radius of curvature substantially equal to one-half of the internal diameter of the conduit.

This proportioning, in the sizes of the items ordinarily embodying the invention, will result in a pair of jet orifices each approaching circular cross-sectional form.

In operation this plumber's nozzle is connected to the end of a garden hose or the like and fed into the blocked pipe preferably all the way to the actual obstruction. The water, under pressure, is then turned on and the combined action of the water and the chisel 16, agitated as much as possible by remote manipulation of the hose, is effective in clearing any minor obstruction.

I claim:
1. A plumber's nozzle, comprising:
a length of flexible hose having a hose connection at one end;
the other end of said hose having a chisel therein;
said chisel having a sharp end disposed distally of the hose and a shank within the hose and secured thereto, and said shank being smaller in cross-section than sad hose so that a fluid outlet of reduced cross section for jet action is defined between said shank and adjacent portions of said hose.
2. A plumber's nozzle according to claim 1 wherein said shank has two opposed flat sides and the hose is secured to said flat sides and said outlet comprises two orifices, one on each of the two remaining sides of said shank.
3. A plumber's nozzle according to claim 2 wherein said remaining sides of the shank are transversely concave to maximize said outlet.

References Cited

UNITED STATES PATENTS

| 1,598,811 | 9/1926 | Ferrin | 30—123.3 UX |
| 2,568,347 | 9/1951 | Lundelius | 15—104.05 UX |
| 2,656,600 | 10/1953 | Barbee | 401—261 X |

EDWARD L. ROBERTS, Primary Examiner

U.S. Cl. X.R.
15—104.05; 30—123.3; 134—167 C